(12) United States Patent
Mount

(10) Patent No.: US 6,273,240 B1
(45) Date of Patent: Aug. 14, 2001

(54) VIBRATORY CONVEYOR AND CONTROL SYSTEM THEREFOR

(75) Inventor: Michael John Mount, Oxon (GB)

(73) Assignee: Wright Machinery Limited, Uxbridge (GB)

( * ) Notice: Subject to any disclaimer, the term of this patent is extended or adjusted under 35 U.S.C. 154(b) by 0 days.

(21) Appl. No.: 09/145,084

(22) Filed: Sep. 1, 1998

(30) Foreign Application Priority Data

Sep. 4, 1997 (GB) ................................................ 9718723

(51) Int. Cl.$^7$ .................................................. B65G 25/00
(52) U.S. Cl. .................. 198/751; 198/370.01; 198/502.2
(58) Field of Search ........................... 198/751, 370.01, 198/502.2, 572, 577, 359

(56) References Cited

U.S. PATENT DOCUMENTS

| | | | |
|---|---|---|---|
| 2,806,583 | * 9/1957 | Morris | 198/359 |
| 3,043,420 | * 7/1962 | Kelly | 198/359 |
| 3,064,357 | * 11/1962 | Butters | 198/502.2 |
| 3,511,363 | * 5/1970 | Sibitz | 198/359 |
| 3,731,787 | * 5/1973 | Gregor | 198/82 |
| 4,181,459 | * 1/1980 | Price | 414/161 |
| 4,344,520 | * 8/1982 | Czoch et al. | 198/347 |
| 4,457,840 | * 7/1984 | Nagl | 209/257 |
| 4,565,279 | * 1/1986 | Musschoot | 198/505 |
| 4,823,366 | * 4/1989 | Williams | 377/2 |
| 5,183,143 | * 2/1993 | Sullivan, Jr. | 198/370 |
| 5,207,310 | * 5/1993 | Maddocks | 198/370 |
| 5,211,277 | * 5/1993 | Mount | 198/358 |
| 5,465,825 | * 11/1995 | Levaro et al. | 198/444 |
| 5,593,018 | * 1/1997 | Gosdowski et al. | 198/370.1 |
| 5,656,325 | * 8/1997 | Wallace | 427/8 |
| 5,753,866 | * 5/1998 | Ikeda et al. | 177/25.18 |
| 5,836,721 | * 11/1998 | Wallace | 406/75 |

* cited by examiner

Primary Examiner—Christopher P. Ellis
Assistant Examiner—Rashmi Sharma
(74) Attorney, Agent, or Firm—Darby & Darby

(57) ABSTRACT

A control system is provided for a vibratory conveyor including a detector applicable to detect when the depth of product on the conveyor is at a determined minimum value. The product-conveying rate of the conveyor is adjusted so that the depth is maintained at or around the minimum value. This is done by logging the total time, during a given period, for which the depth of the product exceeds, or falls below, the determined minimum value, and varying the product-conveying rate depending upon whether the total time that product is detected is more or less than a given percentage of the period.

13 Claims, 2 Drawing Sheets

VIBRATORY CONVEYOR AND CONTROL SYSTEM THEREFOR

BACKGROUND OF THE INVENTION

Vibratory conveyors are used for the transport of free flowing materials, such as crisps and light snacks.

A typical known conveyor is as shown in FIG. 1 of the accompanying drawings and consists of a tray and base with flexible members between the two. The tray consists of a flat longitudinal section with vertical sidewalls. The base is a heavy mass which minimises the transmission of vibration to the support structure (not shown). The flexible members are leaf springs which allow the tray to vibrate when it is excited by a drive. Typically, the tray vibrates at a frequency of 25 Hz and with a stroke of 4 mm.

Because the leaf springs are set at an angle, the motion is essentially horizontal although there is a small vertical component. Hence, the product is projected both forwards and upwards with each oscillation. This produces a flow of product along the length of the conveyor, the arrow indicating the direction of product flow, as also in the other Figures. The speed of flow can be controlled by adjustment of the stroke length of the oscillations.

A conveying system consists of a number of such conveyors. These can be arranged to form a so-called "prioritised" system. The arrangement of a prioritised system is as FIG. 2, except that the illustrated photo eyes P1, P2 and P3, which are described below, are absent. In this system there is a feed onto a first conveyor (C1) and thereafter either to two other conveyors (C2 and C3) or via gates (G1, G2 and G3) which, when open, allow product to fall below to supply packaging stations 1, 2 and 3 (not shown). When the gates are closed product simply passes across them; for example when gate G1 is closed product passes across it from conveyor C1 to conveyor C2. In its simplest form there is a continuous feed of product at the infeed of conveyor C1 and that conveyor runs continuously. If product is needed by station 1 then gate G1 opens and all subsequent conveyors stop, regardless of whether any other station requires product. Only when station 1 is satisfied is product fed to another station in the line and then all conveyors upstream of that station run. So, for example, if packaging station 2 needs product, then gate G2 opens and conveyors C1 and C2 run. Hence the station at the start of the line has highest priority and the priority reduces along the line. In the event of no station requiring product, all the conveyors run and the product is removed from the end of the line.

With more sophisticated control it is possible to define the station priority order so it is not necessarily highest to lowest from the beginning to the end of the line, although still no more than one station is fed at once.

When the supply of product to the system is continuous but the demand is intermittent, it is desirable to have a means of product storage. So-called "semi-prioritised" control allows this storage to take place in the conveyors themselves. This results in gentle product handling and eliminates the need for additional equipment which would otherwise be required for storage purposes.

A typical semi-prioritised system is shown in plan view in FIG. 2 of the accompanying drawings. At the infeed end of each conveyor is a photo eye (P1, P2 and P3) monitoring the product as it is fed onto that conveyor. If more than one packaging station requires product then all the appropriate gates open and all conveyors upstream of those gates run. This has the disadvantageous side effect that gaps are generated in the product flow on the conveyors if more than one packaging station needs product at the same time. For example, if the packaging stations fed by gates G1 and G2 both require product, and both gates are opened, conveyors C1 and C2 both run and feed product respectively to the two gates. As no product is entering the infeed end of conveyor C2 this has the effect that the conveyor C2 progressively empties, beginning at the infeed end, so creating the gap just referred to. In consequence, even if gate G1 is subsequently closed, there will be a period of time for which gate G2 does not receive any product.

What has just been described is to some extent a theoretical idealisation. What in practice tends to happen is that as the product travels along the conveyor the product at either end of the gap spreads out to create a region where there is product of reduced depth, and a point may be reached where the gap disappears altogether. This region of reduced depth is also disadvantageous, at least where the depth falls below a certain level. Thus, for certain products it is desirable to retain heat from the cooking process within the product until it is packed, and this is impaired if the depth of product is substantially reduced. There may also be other disadvantages. These include increased product breakage, increased separation of large and small pieces of product, and, where flavouring is added to the product after cooking (as, for example, with flavoured crisps) less retention of the flavouring in the product.

In storage mode, when no packaging station requires product, product is still fed onto the first conveyor (C1), for example from a cooker. However, conveyor C1 remains stationary until a photo eye P1 detects product, and then it runs at a reduced amplitude, which is typically around 50% of the normal, higher amplitude. The photo eye is set at a level so that the depth of product almost reaches the top of the conveyor's sidewall, before the conveyor runs. The consequence of this is that conveyor C1 runs intermittently as product is introduced to it and progressively fills to a high level from its infeed end to its outfeed end as product is stored on it.

In storage mode, whenever conveyor C1 runs, product is fed onto conveyor C2 and this operates in the same way so that it runs at a reduced amplitude whenever photo eye P2 detects product. Likewise with conveyor C3 and photo eye P3. Hence the system progressively fills to a greater depth from its infeed end as product is stored. Ultimately, when all the conveyors are full and there is no further storage capacity, all the conveyors run at a reduced amplitude, and product is removed from the outfeed end of conveyor C3.

Whenever a packaging station calls for product, control reverts to that described previously, where all conveyors upstream of that packaging station run at the higher amplitude.

The storage capacity of the system is the difference between the product depth when running at the higher amplitude and the product depth when running at the reduced amplitude.

With electronic conveyor drives, it is possible to control the amplitude of vibration of each conveyor using an analogue signal, such as a 4–20 mA signal from a programmable logic controller.

SUMMARY OF THE INVENTION

The present invention provides, in an aspect thereof, a control system for a vibratory conveyor, which system comprises detection means, preferably a photo eye, operable to detect when the depth of product on the conveyor is at at least a determined minimum value, and adjustment means for adjusting the product-conveying rate of the conveyor so that the said depth is maintained at or around the said minimum value. The invention further provides a vibratory conveyor having the aforesaid control system, and also provides a conveyor system which comprises a plurality of conveyors, with the downstream end of one conveyor being arranged to feed product selectively either to the upstream end of another conveyor or to via a gate to a user station, the aforesaid said control system being provided at least on the upstream-most of the conveyors.

This method of control ensures that the gaps referred to above do not arise and that the product depth is always greater than a certain level, regardless of the rate of supply or demand.

DESCRIPTION OF THE DRAWING

The invention will now be further described with reference to the accompanying drawings. In the drawings.

Figure 1:
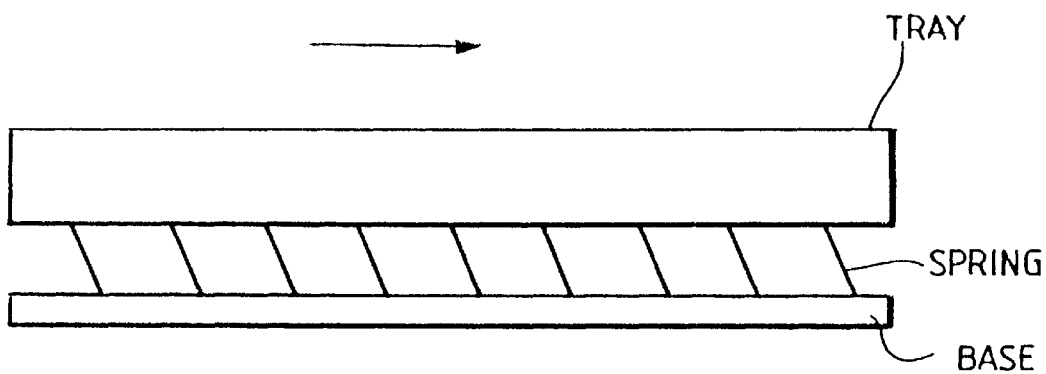
FIG. 1, already referred to, is a diagrammatic side elevation of a known conveyor.
Figure 2:
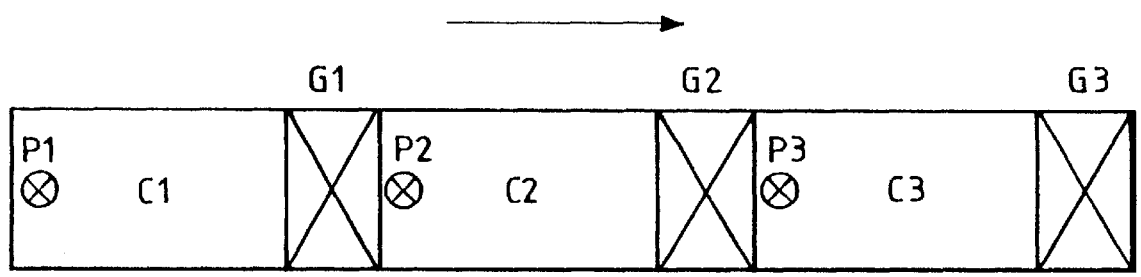
FIG. 2, already referred to, is a diagrammatic plan view of a semi-prioritised system according to the prior art.
Figure 3:
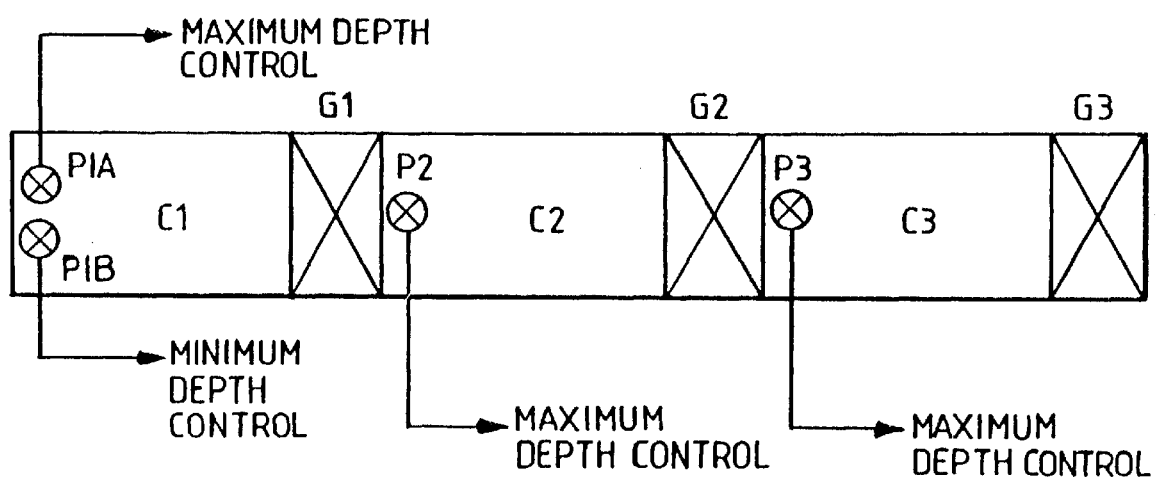
FIG. 3 is a diagrammatic plan view of a conveyor system according to the invention.

In the system of FIG. 3, a photo eye P1A is used as described with reference to FIG. 2 to control the reduced amplitude of vibration of conveyor C1 used in the storage mode. An additional photo eye P1B is set to control operation to maintain the minimum acceptable depth when not in storage mode.

The higher amplitude of conveyor C1 is controlled so that photo eye P1B (which is arranged to detect product only when the product is nearer to it than a distance corresponding to there being the desired minimum acceptable depth on the conveyor) detects product for a given percentage of the time, say, 50% of the time. This can be achieved by logging the total time for which photo eye P1B is detecting product during a period of, say one minute. (Equivalently, one could log the time for which the depth of product was below the predetermined minimum). The amplitude of conveyor C1 is then adjusted to control the detection time so it becomes equal to 50% (or whatever the given percentage is) of the total time. Since the supply of product in such a system is generally fairly constant, a fairly heavily damped algorithm can be used. By this is meant that if, for example, the photo eye P1B were to detect product for much less than 50% (or whatever the given percentage is) of a given minute it would decrease the amplitude of conveyor C1, but not by as much as the shortfall from 50% (or whatever the given percentage is) would require if one were attempting to correct the shortfall in a single step. As a result, a steady state condition is reached after a few minutes. Photo eye P1B is then generally, moment by moment, alternately detecting and not detecting product.

Figure 4:
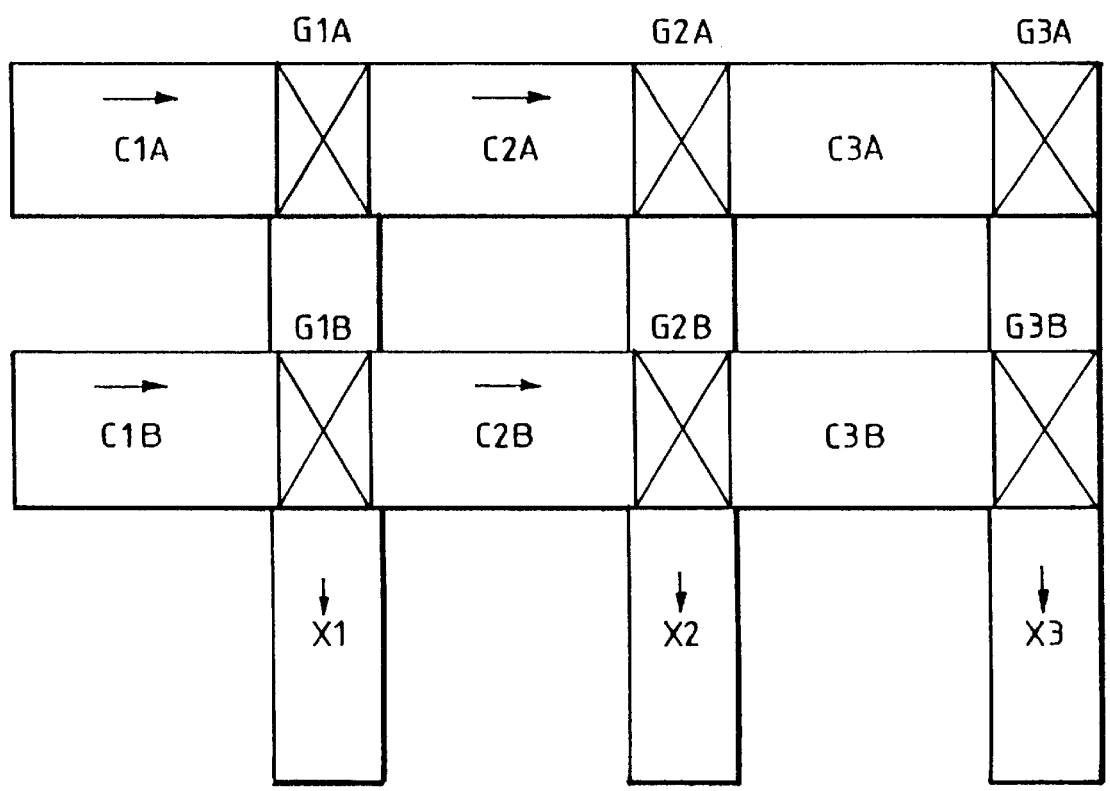
FIG. 4 is a diagrammatic plan view showing a conveyor system with two lines, to which the invention can be applied.

Whenever a packaging station needs product, conveyor C1 runs at the amplitude set by the algorithm. This may be extended to one or more subsequent conveyors. If, for example, the first station is disabled because it is being fed by product from elsewhere, then the higher amplitude of conveyor C2 is made the same as the higher amplitude of conveyor C1, as governed by the algorithm. The minimum product depth is then maintained over the first two conveyors. An example of this is shown in FIG. 4, which illustrates a first conveyor line comprising conveyors C1A, C2A and C3A, and gates G1A, G2A and G3A, and a second conveyor line comprising conveyors C1B, C2B and C3B and gates G1B, G2B and G3B. A first product can be fed to the upstream end of the first conveyor line and a second product can be fed to the upstream end of the second conveyor line. The two lines are interconnected by cross-conveyors X1, X2, X3, which either take the first product from beneath a respective opened gate G1A, G2A, G3A and transport it to user stations at the downstream ends of the cross-conveyors, or take the second product from beneath a respective opened gate G1B, G2B, G3B and similarly transport it. If, for example, gate G1A is open and gate G1B is closed, so that cross-conveyor is fed with the first product, conveyors C1B and C2B operate as though they constituted a single conveyor, and the system of the present invention can be used to maintain the determined minimum on both of them.

I claim:

1. A control system for a vibratory conveyor for conveying a product, the system comprising a detector operable to detect when the depth of product on the conveyor is at a determined minimum value, and adjustment means connected to the detector and operable to adjust the product-conveying rate of the conveyor to which the detector is connected so that the depth of product is maintained at or around said minimum value, said adjustment means being arranged to log the total time, during a given period, for which the depth of product exceeds the determined minimum value, and increase or decrease the product conveying rate depending on whether the total time is more or less, respectively, than a given percentage of the period.

2. A control system for a vibratory conveyor for conveying a product, the system comprising a detector operable to detect when the depth of product on the conveyor is at a determined minimum value, and adjustment means connected to the detector and operable to adjust the product-conveying rate of the conveyor to which the detector is connected so that the depth of product is maintained at or around said minimum value, said adjustment means being arranged to log the total time, during a given period, for which the depth of product exceeds the determined minimum value, and increase or decrease the product conveying rate depending on whether the total time is more or less, respectively, than a given percentage of the period said adjustment means being arranged to log the total time, in a given period, for which the depth of product is below the determined minimum value, and increase or decrease the product conveying rate depending on whether the total time is less or more, respectively, than a given percentage of the period.

3. A system according to claim 2, wherein the product-conveying rate is increased or decreased by an amount which is less than proportional to the amount by which the total time differs from the given percentage of the said period.

4. A system according to claim 1, wherein the given percentage is 50%.

5. A system according to claim 2, wherein the given percentage is 50%.

6. A system according to claim 3, wherein the percentage is 50%.

7. A system according to claim 1, wherein said detector is a photo eye.

8. A system according to claim 1, comprising a further detector operable to detect when the depth of product on the conveyor is at a determined maximum value and cause the conveyor to enter a storage mode in which product is conveyed at a determined lower rate.

9. A system according to claim 8, wherein said further detector is a photo eye.

10. A conveyor system according to claim 8, comprising means for adjusting the product-conveying rate of at least one downstream conveyor of the system to be the same as the product-conveying rate of the upstream-most conveyor, whereby to maintain the same minimum product depth on said downstream conveyor.

11. A control system for a vibratory conveyor for conveying a product, the system comprising a detector operable to detect when the depth of product on the conveyor is at a determined minimum value, an adjustment means connected to the detector and operable to adjust the product-conveying rate of the conveyor to which the detector is connected so that the depth of the product is maintained at or around the minimum value, said adjustment means being operable to log the total time, during a given period, for which the depth of product varies about the determined minimum value and increase or decrease the product-conveying rate depending on whether the total time is more or less, respectively, than a given percentage of the period.

12. A system according to claim 2, comprising a further detector operable to detect when the depth of product on the conveyor is at a determined maximum value and cause the conveyor to enter a storage mode in which product is conveyed at a determined lower rate.

13. A system according to claim 11, comprising a further detector operable to detect when the depth of product on the conveyor is at a determined maximum value and cause the conveyor to enter a storage mode in which product is conveyed at a determined lower rate.

* * * * *